United States Patent Office 3,322,795
Patented May 30, 1967

3,322,795
2-CARBOXYALKYLAMINOCARBONYL DIHYDROPYRANO CHROMONES
Gwynn Pennant Ellis, Heath, Cardiff, Wales, and Arthur Hedley Wragg, Middlewich, England, assignors to Benger Laboratories Limited, Cheshire, England
No Drawing. Continuation of application Ser. No. 261,209, Feb. 26, 1963. This application May 24, 1966, Ser. No. 552,633
Claims priority, application Great Britain, Mar. 7, 1962, 8,730/62
5 Claims. (Cl. 260—345.2)

This application is a continuation of application Ser. No. 261,209, filed Feb. 26, 1963, now abandoned.

The present invention relates to new chemical compounds.

It has been found that the new derivatives of chromones as hereinafter defined possess special activity as inhibitors of autoimmune reactions.

Accordingly the present invention is for the new chromone derivatives of the formula:

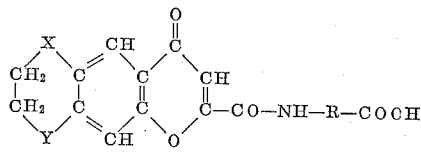

or salts or functional derivatives thereof, wherein the groups —X— and —Y— are different and comprise —CH$_2$— or —O—, and R is an alkylene group (for example of 1-4 carbon atoms such as methylene or ethylene) with or without side chains (for example of 1-4 carbon atoms). R is suitably methylene or ethylidene.

Salts of the chromone derivatives which may be mentioned include metal and ammonium salts of the carboxylic acid function. Functional derivatives which may be mentioned include esters (for example alkyl esters) of the carboxylic acid function.

According to a preferred embodiment, the invention is for chromone derivatives of the formula above, or salts or functional derivatives, wherein R is methylene.

According to a further preferred embodiment, the invention is for 2-carboxymethylaminocarbonyl(7,8-dihydropyrano[2,3-g]chromone) and 2-carboxymethylaminocarbonyl(5',6' - dihydropyrano[2',3' - g]chromone), and salts thereof.

The chromone derivatives of the invention have also been shown in experimental anaphylaxis to inhibit the release of spasmogens which normally followed the combination of specific antigen with antibody. In man, the bronchospasm following the administration of antigen to susceptible subjects is also markedly inhibited. These compounds are therefore also of value in the treatment of any condition in which antigen-antibody combination is primarily responsible for disease, for example asthma, hay fever, urticaria and the like.

Accordingly one embodiment of the invention is for a pharmaceutical composition which contains a chromone derivative as defined above or a salt or functional derivative thereof and a pharmaceutically acceptable carrier. The pharmaceutically acceptable carrier may be liquid and/or solid. The carrier may be for example suitable for the preparation of tablets or the like or suitable for the preparation of solutions for injection or suitable for the preparation of creams, lotions, pastes or the like.

The new chromone derivatives may be prepared by the treatment of the acid of the formula:

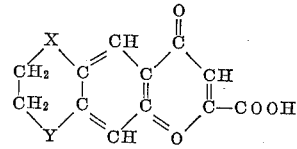

wherein X and Y have the significance indicated above in organic solvent solution with the amino acid of the formula NH$_2$—R—COOH, where R has the significance indicated above, in the presence of a base.

Alternatively, the acid halide of the above chromone acid may be condensed with an ester of the amino acid and the resulting ester may be hydrolysed to the carboxylic acid, for example with hydrochloric acid in acetic acid.

7,8 - dihydropyrano(2,3 - g)chromone-2-carboxylic acid may be prepared by treating beta-(p-methoxyphenoxy)-propionic acid with tetraphosphoric acid to give 6-methoxychromanone which is reduced using Clemmensen's method to 6-methoxychroman, which when treated with boron trifluoride-acetic acid complex undergoes simultaneous acetylation in the 7-position and demethylation at the oxygen in the 6-position to give 7-acetyl-6-hydroxychroman which is then condensed with ethyl oxalate. The resulting diketone cyclises to the pyranochromone ester on heating under reflux with ethanolic hydrogen chloride or to the pyranochromone acid, 7,8-dihydropyrano(2,3-g)-chromone-2-carboxylic acid, with a mixture of glacial acetic acid and hydrochloric acid.

Alternatively 7,8-dihydropyrano(2,3-g)chromone-2-carboxylic acid may be prepared by converting beta(p-hydroxyphenoxy)propionic acid into the acetoxyphenoxy analogue by means of acetic anhydride, and treatment of the beta-(p-acetoxyphenoxy)propionic acid with tetraphosphoric acid gives 6-acetoxychromanone which is simultaneously reduced and deacetylated to 6-hydroxychroman. Reacetylation gives 6-acetoxychroman which undergoes the Fries reaction under the influence of a catalyst such as aluminium chloride to give 7-acetyl-6-hydroxychroman. This may then be converted into 7,8-dihydropyrano(2,3-g)chromone-2-carboxylic acid as described above.

The following examples are given to illustrate the present invention; the parts and percentages are by weight unless otherwise indicated.

EXAMPLE 1

A mixture of 40 parts of beta-(p-methoxyphenoxy)-propionic acid (40 g.) and 300 parts of tetraphosphoric acid was stirred at 50–60° C. for two hours and the resulting deep orange coloured liquid was poured into 1000 parts of cold water. The mixture was stirred well and extracted with ether. The ethereal extract, after washing with aqueous sodium hydrogen carbonate to remove unchanged starting material, was washed with water and dried over anhydrous magnesium sulphate. Removal of the ether gave 6-methoxy-chromanone as a pale yellow oil which solidified on cooling to a mass of needles, melting point 45° C., amount—34.8 parts (93% yield).

50 parts of 6-methoxychromanone, 500 parts of amalgamated zinc and 500 parts of 5 N hydrochloric acid were heated together for 30 minutes and then the liquid was decanted off and extracted with ether. After washing the extract with water and drying with magnesium sulphate, the solvent was distilled off leaving a dark fluorescent oil which on distillation gave 24.1 parts of 6-methoxychroman (52% yield) as a colourless oil, boiling point 78–82° C. at 0.2 mm.

*Analysis.*—Found: C, 73.2; H, 7.55. $C_{10}H_{12}O_2$ requires: C, 73.1; H, 7.4%.

A mixture of 3.3 parts of 6-methoxychroman and 15 parts of 40% boron trifluoride-acetic acid complex was heated under a dry atmosphere with frequent shaking during one hour. The resulting dark brown solution was poured into cold water, made alkaline to Brilliant Yellow (pH 9.5) with aqueous sodium hydroxide solution, cooled and filtered. The filtrate was acidified with concentrated hydrochloric acid whereupon 7-acetyl-6-hydroxychroman was precipitated. After recrystallization from aqueous ethanol, 1 part of the compound formed large pale yellow plates, melting point 111–112° C.

*Analysis.*—Found: C, 68.4; H, 6.4. $C_{11}H_{12}O_3$ requires: C, 68.7; H, 6.3%.

To a solution of 0.2 part of sodium ethoxide in 10 parts of ethanol was added a solution of 0.34 part of 7-acetyl-6-hydroxychroman (0.34 g.) in 6 parts of diethyl oxalate and the mixture was warmed on a steam bath during one hour. The resulting orange coloured precipitate was shaken with 200 parts of dry ether, the solution was filtered and the dried sodium salt was added to 15 parts of 2 N hydrochloric acid. The solid 7-(beta-ethoxycarbonyl-beta-oxopropionyl)-6-hydroxychroman was filtered off, and crystallised from ethanol as shining off-white needles, melting point 149–150° C., amount—0.23 part.

*Analysis.*—Found: C, 62.0; H, 5.5. $C_{15}H_{16}O_6$ requires: C, 61.7; H, 5.5%.

A solution of 0.6 part of the above diketone in 15 parts of 12% dry ethanolic hydrogen chloride was heated under reflux during one hour, cooled and filtered. The residue amounted to 0.4 part and was crystallised from ethanol gave ethyl 7,8-dihydropyrano-(2,3-g)-chromone-2-carboxylate as cream coloured shining needles, melting point 149.5 to 150° C.

*Analysis.*—Found: C, 65.4; H, 5.0. $C_{15}H_{14}O_5$ requires: C, 65.7; H, 5.1%.

When 1.2 parts of the above diketone were heated under reflux for 1.5 hours with 16 parts of glacial acetic acid and 6 parts of concentrated hydrochloric acid and the mixture cooled and filtered, it gave 0.95 part of 7,8-dihydropyrano(2,3-g)chromone-2-carboxylic acid, melting point 285.5 to 286° C., as pale yellow needles (from glacial acetic acid).

*Analysis.*—Found: C, 62.9; H, 4.0. $C_{13}H_{10}O$ requires: C, 63.4; H, 4.1%.

7,8 - dihydropyrano(2,3-g)chromone-2-carboxylic acid was dissolved in a mixture of dry toluene and triethylamine with slight warming. This solution was kept at −8° C. to −5° C. whilst ethyl chloroformate was added. After the mixture had been left to stand at −5° C. a solution of glycine in N-sodium hydroxide solution, was added with vigorous stirring. After further stirring at room temperature, water and sodium carbonate solution were added to make the solution alkaline and to dissolve the solid present. The toluene layer was separated and discarded after washing with sodium carbonate solution. The combined carbonate solution was washed with ether, decolorised with charcoal, filtered and acidified with hydrochloroic acid. Crude 2-carboxymethylaminocarbonyl(7,8-dihydropyrano-[2,3-g]-chromone) was filtered off, washed with water and dried.

The acid was converted into its sodium salt by suspending the acid in water, adding the theoretical amount of sodium hydroxide solution and freeze-drying the resulting solution to give a white powder.

EXAMPLE 2

7.3 parts of beta-(p-hydroxyphenoxy)propionic acid were dissolved in 28 parts of 15% aqueous sodium hydroxide solution, 30 parts of crushed ice were added, followed by 28 parts of acetic anhydride. The solution was shaken vigorously for 3 minutes and after a further 15 minutes it was acidified with concentrated hydrochloric acid and stirred until precipitation was complete. Filtration followed by decolourizing with charcoal and crystallization of the residue from water gave 6.2 parts of beta-(p-acetoxyphenoxy)propionic acid (69.5% yield) as fine white needles, melting point 108° C.

*Analysis.*—Found: C, 59.1; H, 5.5. $C_{11}H_{12}O_5$ requires: C, 58.9; H, 5.4%.

A mixture of 5 parts of beta-(p-acetoxyphenoxy)propionic acid and 50 parts of tetraphosphoric acid was stirred at 40–50° C. during 1½ hours, and the resulting orange-coloured solution was added to 150 parts of crushed ice with stirring. The mixture was extracted with ether, the ethereal solution was washed successively with aqueous sodium hydrogen carbonate and water, and dried over magnesium sulphate. Removal of the solvent left 3.5 parts of a pale yellow oil which readily solidified and was recrystallized from water to give 6-acetoxychromanone as fine white needles, melting point 77–78° C.

*Analysis.*—Found: C, 64.4; H, 5.1. $C_{11}H_{10}O_4$ requires: C, 64.1; H, 4.9%.

7 parts of 6-acetoxychromanone were heated under reflux for 5 hours with 70 parts of amalgamated zinc and 100 parts of 5 N hydrochloric acid. The liquid was decanted, extracted with ether, and the ethereal layer was washed with water, dried with anhydrous magnesium sulphate and the solvent distilled off. Crystallization of the residue from a large volume of cyclohexane gave 1.8 parts of 6-hydroxychroman, melting point 99–100° C. as elongated plates.

*Analysis.*—Found: C, 72.0; H, 6.9. $C_9H_{10}O_2$ requires: C, 72.0; H, 6.7%.

To a mixture of 1.2 parts of 6-hydroxychroman, 15 parts of 10% aqueous sodium hydroxide solution and 20 parts of crushed ice were added 2 parts of acetic anhydride. The mixture was shaken vigorously for 5 minutes. The precipitated 6-acetoxychroman was filtered off, in amount of 1.28 parts, and crystallized from aqueous ethanol as small prismatic needles, melting point 52.5 to 53.5° C.

*Analysis.*—Calculated for $C_{11}H_{12}O_3$: C, 68.7; H, 6.3%. Found: C, 68.5; H, 6.5.

An intimately ground mixture of 0.75 part of 6-acetoxychroman and 0.8 part of resublimed anhydrous aluminium chloride was heated at 120° C. during 30 minutes. The resulting complex was decomposed by addition of 20 parts of ground ice and 2 parts of hydrochloric acid. An ether extract of this mixture was obtained and this was shaken with 10% aqueous sodium hydroxide solution. The aqueous layer was separated and acidified with hydrochloric acid whereupon 7-acetyl-6-hydroxychroman was filtered off and crystallized from ethanol as yellow plates, melting point 111–112° C., identical with the sample described in Example 1, in amount comprising 0.1 part. 7-acetyl-6-hydroxychroman was then treated with diethyl oxalate as described in Example 1 to give 7,8-dihydropyrano(2,3-g)chromone-2-carboxylic acid.

A suspension of finely powdered 7,8-dihydropyrano (2,3-g)chromone-2-carboxylic acid in dry benzene, dimethylformamide and thionyl chloride was stirred vigorously under dry nitrogen and refluxed until all the acid had just dissolved. The solution was evaporated to dryness in vacuo on the steam-bath. Further benzene was added and distilled off to remove excess of thionyl chloride. Care was taken to keep the apparatus filled with nitrogen when not evacuated. The remaining dark crystalline solid was dissolved in dry benzene and the solution was stirred under nitrogen. To the solution was added freshly prepared ethyl glycinate dropwise. The temperature was kept down to about 30° C. A solid began to separate out during the addition. Stirring at room temperature was continued for a further 20 minutes and the mixture was left overnight at room temperature.

Water was then added and after stirring vigorously the product was filtered off, washed with a little cold benzene and water and dried at 100° C.

A solution of the above ester was dissolved in acetic acid and concentrated hydrochloric acid. The solution was refluxed and left to cool overnight. The solid product was filtered off, washed with a little acetic acid and much water and dried at 100° C. 2-carboxymethylaminocarbonyl (7,8-dihydropyrano[2,3-g]chromone) crystallized out.

EXAMPLE 3

5′,6′-dihydropyrano(2′,3′-g)chromone-2-carboxylic acid was suspended in dioxan and warmed with an excess of triethylamine until all was dissolved. The excess of amine was distilled off in vacuo and further dioxan and toluene were added. The solution was cooled to 0° C. and ethyl chloroformate in a little dioxan was added. After the solution had been shaken for 15 minutes at 0° C. a fine white precipitate formed. A solution of glycine in N sodium hydroxide was added and the mixture shaken at 0° C. for 30 minutes. A precipitate formed slowly from the solution. After the addition of excess of potassium bicarbonate solution the precipitate dissolved and the solution was evaporated to 250 millilitres, charcoaled, and acidified with concentrated hydrochloric acid. The fine precipitate which formed was filtered off, washed with water and recrystallized from ethanol to give 2-carboxymethylaminocarbonyl(5′,6′-dihydropyrano[2,3-g]chromone).

This was converted to its sodium salt as in Example 1.

EXAMPLE 4

The clinical evaluation of 2-carboxymethylaminocarbonyl(7,8-dihydroxypyrano[2,3-g]chromone) as the sodium salt (Compound A) and 2-carboxymethylaminocarbonyl(5′,6′-dihydropyrano[2,3-g]chromone) as the sodium salt (Compound B) was based on the antigen inhalation provocation test. The human volunteers selected for test purposes suffered from specific allergic asthma. In these subjects an asthma attack normally followed the inhalation of an antigen to which they were specifically sensitive. The degree of asthma provoked by this method can be measured by repeated estimation of the reduction of air way resistance.

A suitably designed spirometer was used to measure the forced expiratory volume at one second (F.E.V.$_{1.0}$), hence the changes in air way resistance. The anti-allergic activity of a compound is estimated from the difference between the maximum percent F.E.V.$_{1.0}$ reduction following control and test provocations after drug administration conducted under identical experimental conditions.

With this test procedure both Compound A and Compound B when inhaled as a 0.5% aerosol (estimated dose inhaled=0.1 mg.), afforded increased protection when administered 10 minutes before the antigen as compared with antihistamines, such as for example mepyramine, which afforded less than 10% protection under similar conditions or following maximal clinical dosage by oral or intramuscular routes.

Having thus disclosed the invention, what is claimed is:

1. A member selected from the group consisting of compounds of the formulae:

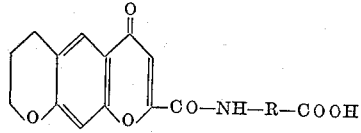

and

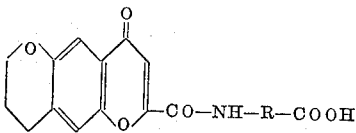

and alkali metal and ammonium salts thereof, wherein R is alkylene of from 1 to 4 carbon atoms inclusive.

2. A compound according to claim 1, said compound being 2-carboxymethylaminocarbonyl(7,8-dihydropyrano-[2,3-g]chromone).

3. A compound according to claim 1, said compound being 2-carboxymethylaminocarbonyl(7,8 - dihydropyrano-[2,3-g]chromone) sodium salt.

4. A compound according to claim 1, said compound being 2-carboxymethylaminocarbonyl(5′,6′-dihydropyrano-[2′,3′-g]-chromone).

5. A compound according to claim 1, said compound being 2-carboxymethylaminocarbonyl(5′,6′-dihydropyrano-[2′,3′-g]-chromone) sodium salt.

References Cited

UNITED STATES PATENTS 3,000,891   9/1961   Janssen _____ 260—268

OTHER REFERENCES

German Application No. C9856 IVb, 260-345.2 Nov. 29, 1956.

Naylor et al., Journal Chemical Society, London, pp. 1956-1958 (1960).

Noller, Chemistry of Organic Compounds, pp. 244–245, 2nd edition, W. B. Saunders Co., Philadelphia (1957).

Schmid et al., Helvetica Chimica Acta, vol. 35, pp. 1990–1996 (1952).

WALTER A. MODANCE, *Primary Examiner.*

NORMA S. MILESTONE, *Assistant Examiner.*